US011803083B2

(12) United States Patent
Lim et al.

(10) Patent No.: US 11,803,083 B2
(45) Date of Patent: Oct. 31, 2023

(54) BACKLIGHT UNIT AND DISPLAY DEVICE

(71) Applicant: LG Display Co., Ltd., Seoul (KR)

(72) Inventors: KiSung Lim, Paju-si (KR); JinSu Moon, Paju-si (KR); MyungWon Seo, Paju-si (KR); Hyunmin Park, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 17/978,808

(22) Filed: Nov. 1, 2022

(65) Prior Publication Data

US 2023/0205009 A1 Jun. 29, 2023

(30) Foreign Application Priority Data

Dec. 28, 2021 (KR) ........................ 10-2021-0189247

(51) Int. Cl.
*G02F 1/1335* (2006.01)
*F21V 8/00* (2006.01)
*F21V 9/30* (2018.01)

(52) U.S. Cl.
CPC ..... *G02F 1/133614* (2021.01); *G02B 6/0031* (2013.01); *F21V 9/30* (2018.02)

(58) Field of Classification Search
CPC .... G02B 6/0026; G02B 6/003; G02B 6/0031; F21V 9/30
See application file for complete search history.

(56) References Cited

U.S. PATENT DOCUMENTS

| | | | | |
|---|---|---|---|---|
| 11,073,723 | B2 * | 7/2021 | Kim | G02F 1/133603 |
| 11,327,363 | B2 * | 5/2022 | Shao | G02B 6/0088 |
| 2007/0090755 | A1 * | 4/2007 | Eida | H10K 59/38 |
| | | | | 313/506 |
| 2015/0036317 | A1 * | 2/2015 | Yamamoto | F21V 9/08 |
| | | | | 362/84 |
| 2015/0338705 | A1 * | 11/2015 | Itou | F21V 9/00 |
| | | | | 349/71 |
| 2016/0097495 | A1 * | 4/2016 | Yamamoto | H01L 33/54 |
| | | | | 349/65 |
| 2016/0370526 | A1 * | 12/2016 | Kim | G02B 6/005 |
| 2017/0122527 | A1 * | 5/2017 | Miyanaga | H01L 33/50 |
| 2017/0205548 | A1 * | 7/2017 | Park | G02F 1/133606 |
| 2018/0023771 | A1 * | 1/2018 | Kim | H01L 33/504 |
| | | | | 362/84 |
| 2019/0088186 | A1 * | 3/2019 | Huang | G02B 6/0003 |
| 2020/0159078 | A1 * | 5/2020 | Watanabe | G02F 1/136209 |
| 2020/0183224 | A1 * | 6/2020 | Lee | G02F 1/133514 |
| 2021/0003888 | A1 * | 1/2021 | Kim | G02F 1/133605 |
| 2021/0026202 | A1 * | 1/2021 | Nam | G02F 1/133609 |

* cited by examiner

*Primary Examiner* — Zheng Song
(74) *Attorney, Agent, or Firm* — Fenwick & West LLP

(57) ABSTRACT

A backlight unit and a display device are disclosed. There may be provided a backlight unit and a display device with enhanced light absorption of light of an absorption wavelength band and enhanced color gamut, by including a color conversion layer (or color conversion film) for converting the wavelength band of the light emitted from a light source and a light absorption layer (or light absorption film) for absorbing light of a specific absorption wavelength band, in an area adjacent the light source.

18 Claims, 10 Drawing Sheets

BACKLIGHT UNIT AND DISPLAY DEVICE

CROSS-REFERENCE TO RELATED APPLICATION

This application claims priority from Republic of Korea Patent Application No. 10-2021-0189247, filed on Dec. 28, 2021, which is hereby incorporated by reference in its entirety.

BACKGROUND

Field

Embodiments of the disclosure relate to a backlight unit and a display device.

Description of Related Art

The display device may display an image corresponding to image data by controlling the brightness indicated by a plurality of subpixels disposed on the display panel.

Each of the plurality of subpixels may emit light of a specific wavelength band, and a color image may be displayed by a combination of light emitted from the plurality of subpixels.

A method for more precisely controlling the wavelength band of the light emitted by each of the plurality of subpixels is required to enhance the color gamut of the image displayed through the display panel.

SUMMARY

Embodiments of the disclosure may provide a method for enhancing the color gamut of the image displayed through the display panel while reducing an increase in the manufacturing cost and simplifying the structure of the display device.

Embodiments of the disclosure may provide a display device comprising a display panel and a backlight unit supplying light to the display panel, wherein the backlight unit includes a plurality of light sources emitting light of a first wavelength band and a light source protection portion disposed to surround the plurality of light sources and including a color conversion layer converting at least a portion of the light of the first wavelength band into light of a wavelength band other than the first wavelength band and a light absorption layer disposed on the color conversion layer and absorbing light of an absorption wavelength band which is a portion of a white wavelength band.

Embodiments of the disclosure may provide a display device comprising a display panel and a backlight unit supplying light to the display panel, wherein the backlight unit includes a plurality of light sources emitting light of a first wavelength band and a color conversion sheet positioned between the plurality of light sources and the display panel and including a color conversion film converting at least a portion of the light of the first wavelength band into light of a wavelength band other than the first wavelength band and a light absorption film disposed on the color conversion film and absorbing light of an absorption wavelength band which is a portion of a white wavelength band.

Embodiments of the disclosure may provide a backlight unit comprising a plurality of light sources disposed on a circuit board and emitting light of a first wavelength band, a color conversion layer disposed on the plurality of light sources and in contact with the plurality of light sources and converting at least a portion of the light of the first wavelength band into light of a wavelength band other than the first wavelength band, a light absorption layer disposed on the color conversion layer and absorbing light of an absorption wavelength band which is a portion of a white wavelength band, and a light path control film including a plurality of light path control patterns disposed on the light absorption layer, positioned in respective corresponding areas of the plurality of light sources, and blocking at least a portion of light emitted from the plurality of light sources.

According to embodiments of the disclosure, there may be provided a display device capable of increasing color gamut by increasing light absorption by the light absorption layer (or light absorption film) which is disposed on the color conversion layer (or color conversion film) to absorb light of an absorption wavelength band.

BRIEF DESCRIPTION OF DRAWINGS

The above and other objects, features, and advantages of the disclosure will be more clearly understood from the following detailed description, taken in conjunction with the accompanying drawings, in which.

DETAILED DESCRIPTION

In the following description of examples or embodiments of the disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the disclosure, detailed descriptions of well-known functions and components incorporated herein will be omitted when it is determined that the description may make the subject matter in some embodiments of the disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Hereinafter, various embodiments of the disclosure will be described in detail with reference to accompanying drawings.

Figure 1:
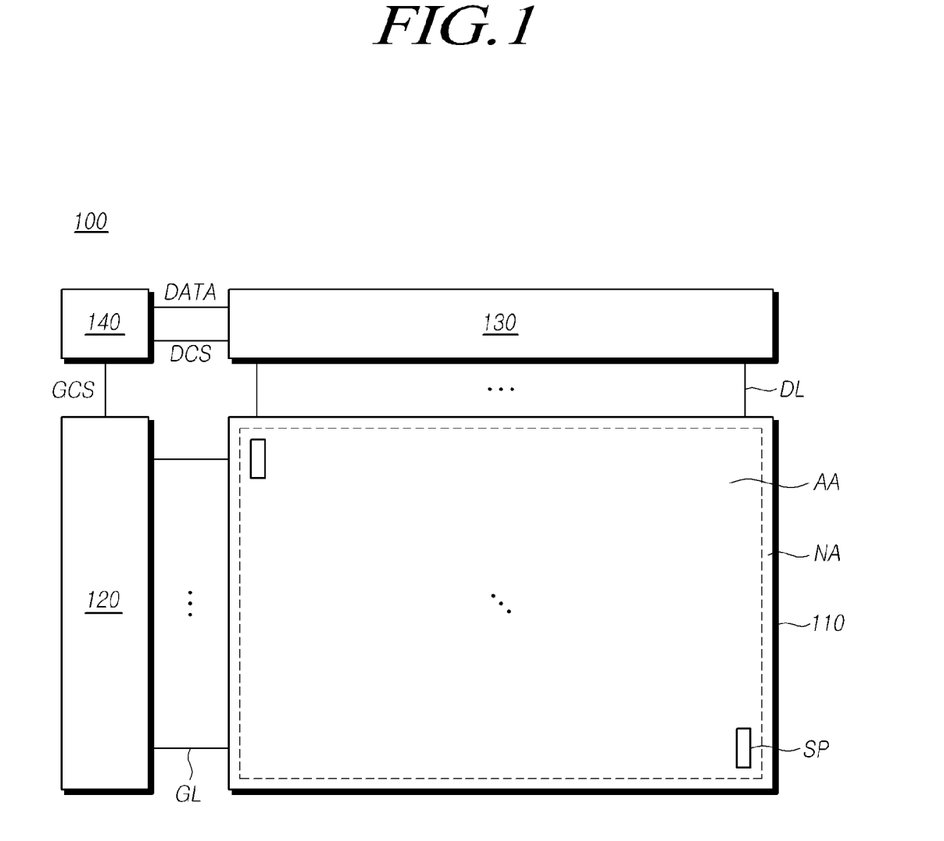
FIG. 1 is a view schematically illustrating a configuration of a display device according to various embodiments of the disclosure.

FIG. 1 is a view schematically illustrating a configuration of a display device 100 according to various embodiments of the disclosure.

Referring to FIG. 1, a display device 100 may include a display panel 110, a gate driving circuit 120, a data driving circuit 130, and a controller 140 for driving the display panel 110.

The display panel 110 may include an active area AA in which a plurality of subpixels SP are disposed and a non-active area NA positioned outside the active area AA. A plurality of gate lines GL and a plurality of data lines DL may be disposed on the display panel 110. The plurality of subpixels SP may be positioned in areas where the gate lines GL and the data lines DL intersect.

The gate driving circuit 120 may be controlled by the controller 140. The gate driving circuit 120 sequentially outputs scan signals to a plurality of gate lines GL disposed on the display panel 110 and may control driving timings of the plurality of subpixels SP.

The gate driving circuit 120 may include one or more gate driver integrated circuits (GDIC). The gate driving circuit 120 may be located only on one side of the display panel 110 or on each of two opposite sides according to driving methods.

Each gate driver integrated circuit GDIC may be connected to a bonding pad of the display panel 110 using a tape automated bonding (TAB) method or a chip on glass (COG) method. Alternatively, each gate driver integrated circuit GDIC may be implemented in a gate in panel (GIP) type and be disposed directly on the display panel 110. Alternatively, each gate driver integrated circuit GDIC may be integrated and disposed on the display panel 110. Each gate driver integrated circuit (GDIC) may also be implemented in a chip-on-film (COF) scheme to be mounted on a film connected to the display panel 110.

The data driving circuit 130 may receive image data DATA from the timing controller 140 and convert the image data DATA into an analog data voltage. The data driving circuit 130 may output a data voltage to each data line DL according to the timing at which a scan signal is applied through the gate line GL and may control each subpixel SP to represent a brightness according to the image data.

The data driving circuit 130 may include one or more source driver integrated circuits (SDICs). Each source driver integrated circuit (SDIC) may include, e.g., shift registers, latch circuits, digital-analog converters, and output buffers.

Each source driver integrated circuit SDIC may be connected to a bonding pad of the display panel 110 using a tape automated bonding (TAB) method or a chip on glass (COG) method. Alternatively, each source driver integrated circuit SDIC may be directly disposed on the display panel 110. Alternatively, each source driver integrated circuit SDIC may be integrated and disposed on the display panel 110. Alternatively, each source driver integrated circuit SDIC may be implemented by a chip on film (COF) method. In this case, each source driver integrated circuit SDIC may be mounted on a film connected to the display panel 110 and may be electrically connected to the display panel 110 through lines on the film.

The controller 140 may supply various control signals to the gate driving circuit 120 and the data driving circuit 130 and control the driving of the gate driving circuit 120 and the data driving circuit 130.

The controller 140 may be mounted on a printed circuit board or a flexible printed circuit. The controller 140 may be electrically connected to the gate driving circuit 120 and the data driving circuit 130 through a printed circuit board or a flexible printed circuit.

The controller 140 may control the gate driving circuit 120 to output a scan signal according to the timing set in each frame. The controller 140 may convert the image data received from outside (e.g., a host system) the display device according to a data signal format used by the data driving circuit 130 and output the converted image data DATA to the data driving circuit 130.

The controller 140 may receive, from the outside (e.g., a host system), various timing signals including a vertical synchronization signal VSYNC, a horizontal synchronization signal HSYNC, an input data enable signal DE, and a clock signal, along with the image data DATA.

The controller 140 may generate a diversity of control signals using the timing signals received from the outside and output the control signals to the gate driving circuit 120 and the data driving circuit 130.

As an example, to control the gate driving circuit 120, the controller 140 may output various gate control signals GCS including a gate start pulse GSP, a gate shift clock GSC, and a gate output enable signal GOE.

The gate start pulse GSP may control the operation start timing of one or more gate driver integrated circuits GDICs constituting the gate driving circuit 120. The gate shift clock GSC is a clock signal commonly input to one or more gate driver integrated circuits GDICs and may control the shift timing of the scan signals. The gate output enable signal GOE may designate timing information about one or more gate driver integrated circuits GDICs.

To control the data driving circuit 130, the controller 140 may output various data control signals DCS including, e.g., a source start pulse SSP, a source sampling clock SSC, and a source output enable signal SOE, to the data driving circuit 130.

The source start pulse SSP may control the data sampling start timing of one or more source driver integrated circuits SDICs constituting the data driving circuit 130. The source sampling clock SSC may be a clock signal for controlling the sampling timing of data in each of one or more source driver integrated circuits SDIC. The source output enable signal SOE may control the output timing of the data driving circuit 130.

The display device 100 may further include a power management integrated circuit that supplies various voltages or currents to, e.g., the display panel 110, the gate driving circuit 120, and the data driving circuit 130 or controls various voltages or currents to be supplied.

Each subpixel SP may be an area defined by the crossing of a gate line GL and a data line DL, and a liquid crystal layer or a light emitting element may be disposed in each subpixel SP depending on the type of the display device 100.

For example, if the display device 100 is an electroluminescent display device, a light emitting element and several elements for driving the light emitting element may be disposed in each of the plurality of subpixels SP. The light emitting element may be, e.g., an organic light emitting diode, an inorganic light emitting diode, and a quantum dot light emitting diode, but is not limited thereto. The display device 100 may control the driving current supplied to the light emitting element by the circuit element disposed in the subpixel SP and display an image corresponding to the image data.

As another example, when the display device 100 is a liquid crystal display device, the display panel 110 may include a liquid crystal layer. The display panel 110 may include, e.g., an array substrate on which a circuit element for driving the liquid crystal layer is disposed and a color filter substrate on which a color filter for realizing a color is disposed. The display device 100 may include a backlight unit that supplies light to the display panel 110 and may display the image corresponding to the image data by driving the liquid crystal layer and using the light supplied from the backlight unit.

The backlight unit may include, e.g., an element for emitting light and various optical elements for enhancing the efficiency of light supplied to the display panel 110 and the wavelength range of the light.

Figure 2:
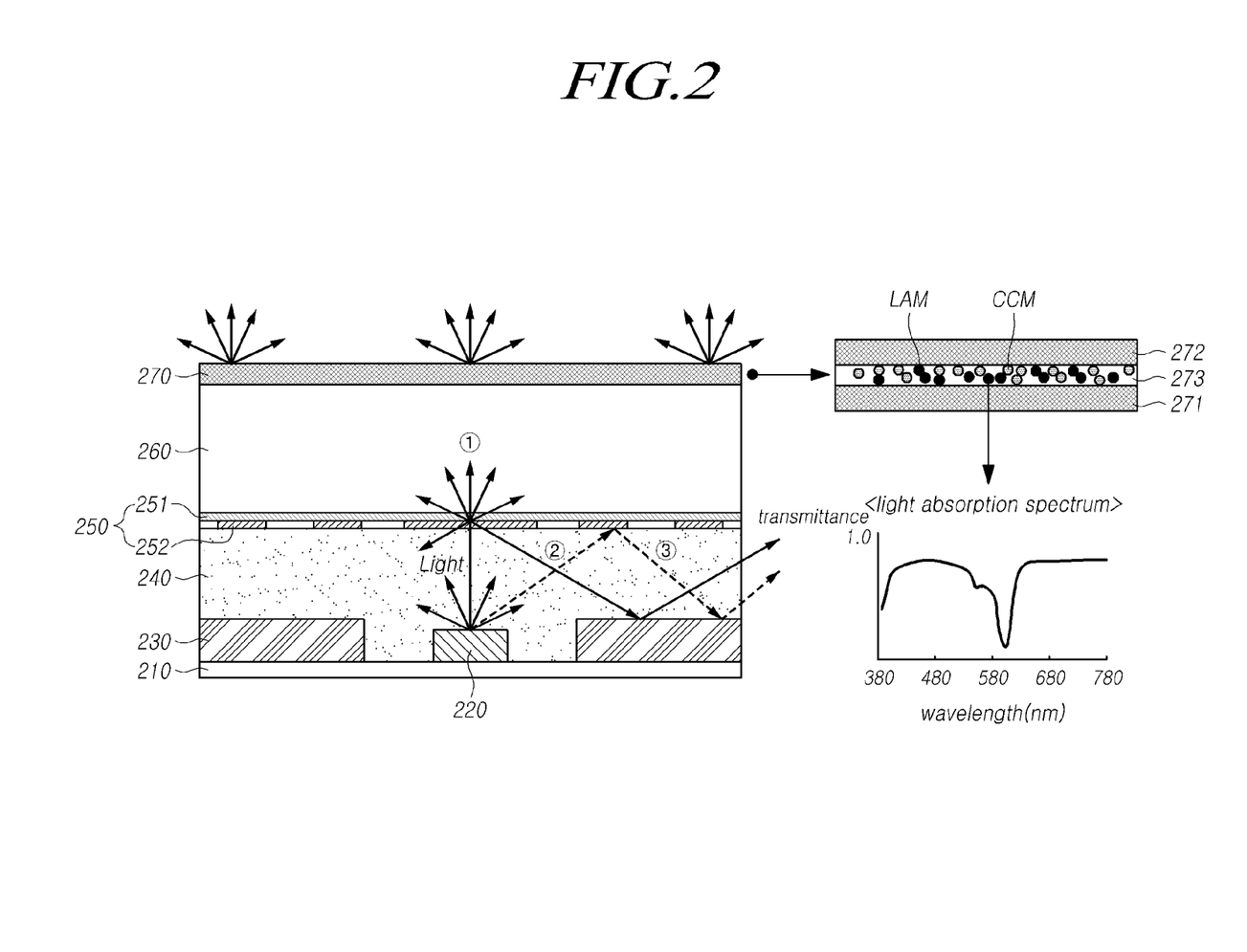
FIG. 2 is a cross-sectional view illustrating an example structure of a backlight unit according to embodiments of the disclosure.
Figure 3:
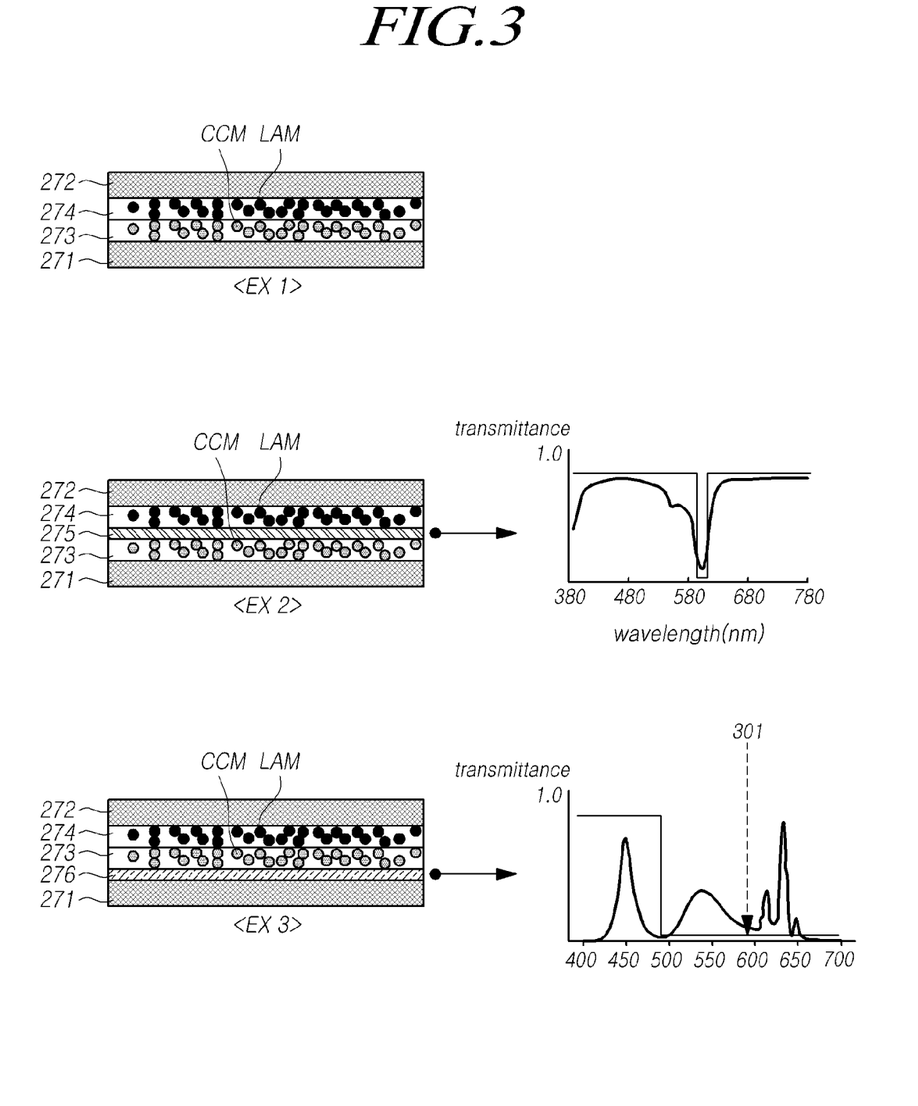
FIG. 3 is a view illustrating an example of a color conversion sheet according to embodiments of the disclosure.

FIG. 2 is a cross-sectional view illustrating an example structure of a backlight unit according to embodiments of the disclosure. FIG. 3 is a view illustrating an example of a color conversion sheet 270 according to embodiments of the disclosure.

Referring to FIG. 2, the backlight unit may be positioned under the display panel 110 and may supply light to the display panel 110.

The backlight unit may include a plurality of light sources 220 to supply light to the display panel 110.

The light source 220 may be, e.g., a light emitting diode and may be an ultra-small mini light emitting diode or a micro light emitting diode.

The light source 220 may be mounted on the circuit board 210. Although not shown in FIG. 2, the circuit board 210 on which the light source 220 is mounted and various optical elements may be received by the cover bottom.

The circuit board 210 may be a flexible printed circuit for example. Alternatively, the circuit board 210 may be a circuit board where signal lines or thin film transistors are disposed on a rigid substrate, e.g., a glass substrate.

The light source 220 may emit light according to the signal supplied by the signal line disposed on the circuit board 210. The light source 220 may emit light in a white wavelength band or emit light in a specific wavelength band. For example, the light source 220 may emit light of a first wavelength band. In the disclosure, the light of the first wavelength band may mean blue light.

A reflector 230 may be disposed in at least a partial area of the area where the light source 220 is not disposed on the circuit board 210.

The reflector 230 may include a plurality of holes formed in an area corresponding to the position of the light source 220. The reflector 230 including a hole may be seated and disposed on the circuit board 210 on which the light source 220 is mounted.

The upper end of the reflector 230 may be positioned higher than the upper end of the light source 220, but is not limited thereto. In some cases, without the reflector 230, a material having a high reflectivity may be coated on the circuit board 210. Alternatively, a reflector 230 may be disposed on the circuit board 210, with a high-reflective material coated, increasing reflectivity in the entire area.

A light source protection portion 240 may be disposed on the light source 220 and the reflector 230.

The light source protection portion 240 may be formed of, e.g., resin, but is not limited thereto.

The light source protection portion 240 may protect the light source 220 and may perform a function of guiding the light emitted from the light source 220.

Various optical sheets may be disposed on the light source protection portion 240.

For example, a light path control film 250 may be disposed on the light source protection portion 240.

The light path control film 250 may include a base film 251 and a plurality of light path control patterns 252 disposed on at least one surface of upper and lower surfaces of the base film 251.

The base film 251 may be a transparent film. The base film 251 may be formed of, e.g., PET or the like, but is not limited thereto.

The plurality of light path control patterns 252 may be disposed on the lower surface of the base film 251. Each of the plurality of light path control patterns 252 may be positioned in an area corresponding to the area where each of the plurality of light sources 220 is disposed.

The light path control pattern 252 may be disposed only in an area on the light source 220, for example. Alternatively, the light path control pattern 252 may be disposed on an area including the light source 220 and its surroundings.

The light path control pattern 252 may be disposed in a single shape or in a single layer and may be composed of multiple layers or multiple portions. When the light path control pattern 252 is composed of a plurality of layers or a plurality of portions, the material or thickness of the light path control pattern 252 may be varied so that the portion closest to the light source 220 has the highest light blocking performance and, farther away from the light source 220, the light blocking performance reduces.

The light path control pattern 252 may control the path of the light emitted from the light source 220. The light path control pattern 252 may be formed of, e.g., a material, such as TiO2, and may have high light blocking performance, but is not limited thereto.

The light path control pattern 252 may transmit, reflect, or diffract at least a portion of the light emitted from the light source 220.

For example, the light path control pattern 252 may transmit a portion of the light emitted from the light source 220 (①).

Since the light path control pattern 252 is formed of a material having high light blocking performance, the amount of light passing through the light path control pattern 252 may be very small.

The light path control pattern 252 may reflect a portion of the light emitted from the light source 220 (②, ③).

The light reflected by the light path control pattern 252 may be reflected by the reflector 230 to the upper portion of the light source protection portion 240.

The light path control pattern 252 may be disposed in an area where the intensity of light emitted from the light source 220 is highest to reduce transmitted light and spread the light around the light source 220, so that the light may be uniformly supplied to the upper portion of the light source protection portion 240.

A diffusion plate 260 and various optical sheets may be disposed on the light path control film 250.

When the light source 220 emits light in the first wavelength band, a color conversion sheet 270 may be disposed on the diffusion plate 260.

The color conversion sheet 270 may convert at least a portion of the light of the first wavelength band into light of a wavelength band other than the first wavelength band. For example, the color conversion sheet 270 may convert light of the first wavelength band into light of a second wavelength band (e.g., green light) and light of a third wavelength band (e.g., red light).

The light of the first wavelength band emitted by the light source 220 and the light of the second wavelength band and the light of the third wavelength band converted into by the color conversion sheet 270 may be mixed into light of a white wavelength band that may then be supplied to the display panel 110.

The color conversion sheet 270 may include a material that absorbs light of some wavelength bands to increase the color gamut of the light supplied to the display panel 110.

For example, the color conversion sheet 270 may include a lower film 271, an upper film 272, and a color conversion film 273 positioned between the lower film 271 and the upper film 272.

The lower film 271 and the upper film 272 may be films formed of PET or the like, but are not limited thereto.

The color conversion film 273 may include a color conversion material CCM that converts light of a first wavelength band into light of a wavelength band other than the first wavelength band. For example, the color conversion material CCM may be a phosphor, but is not limited thereto.

Further, the color conversion film 273 may include a light absorption material LAM that absorbs light of an absorption wavelength band. The light absorption material LAM may be a material (e.g., TAP) that absorbs light of a specific wavelength band, but is not limited thereto.

The light absorption material LAM may have high absorption and low transmittance for the light of the absorption wavelength band. The light absorption material LAM may have low absorption for light of a wavelength band other than the absorption wavelength band, or may transmit the light of the wavelength band other than the absorption wavelength band, as it is.

The absorption wavelength band may be included in a white wavelength band. In some cases, the absorption wavelength band may be included in the wavelength band of light converted by the color conversion material CCM.

The light absorption material LAM may absorb the light of the absorption wavelength band that is a portion of the white wavelength band. Since the light absorption material LAM absorbs the light of the specific absorption wavelength band, it is possible to adjust the wavelength band of the light absorbed by the light absorption material LAM to thereby increase the color gamut of the light emitted onto the color conversion sheet 270.

For example, the light absorption material LAM may have high absorption for light of a wavelength band of 590 nm to 600 nm. Further, the light absorption material LAM may have high absorption for light of a wavelength of 595 nm.

The wavelength band of light absorbed by the light absorption material LAM may be, e.g., a wavelength band positioned at the boundary between green light and red light. Since the light of the specific wavelength band is absorbed by the light absorption material LAM, green light, and red light emitted onto the color conversion sheet 270 may be separated, and overall color gamut may be enhanced.

Further, the wavelength band of the light absorbed by the light absorption material LAM may be varied as necessary. Further, two or more types of light absorption materials LAM having absorption for light of different wavelength bands may be included in the color conversion sheet 270.

The color conversion material CCM and the light absorption material LAM included in the color conversion film 273 may be mixed and disposed on a single layer as illustrated in FIG. 2 or, in some cases, be disposed separately on different layers.

Referring to FIG. <EX 1> of FIG. 3, the color conversion sheet 270 may include a lower film 271, an upper film 272, a color conversion film 273, and a light absorption film 274. The color conversion film 273 and the light absorption film 274 may be disposed between the lower film 271 and the upper film 273.

The light absorption film 274 may be disposed between the color conversion film 273 and the upper film 272.

Since the light absorption film 274 including the light absorption material CCM is disposed separately on the color conversion film 273, the light of the absorption wavelength band among the light supplied by the light source 220 and the color conversion film 273 may be enhanced. Further, since the light absorption film 274 is positioned close to the color conversion film 273, the efficiency of light absorption by the light absorption film 274 may be high as compared to when the light absorption film 274 is positioned far from the color conversion film 273. When the light absorption film 274 is positioned far from the color conversion film 273, the light absorption efficiency by the light absorption film 274 may be reduced. For example, when a diffusion sheet for diffusing light is disposed between the light absorption film 274 and the color conversion film 273, the light absorption efficiency may be maintained or the decrease in light absorption efficiency may not be significant. On the other hand, when a prism sheet providing a light collection function is disposed between the light absorption film 274 and the color conversion film 273, the light absorption efficiency by the light absorption film 274 may be reduced. Since the light absorption film 274 and the color conversion film 273 are disposed close to each other without, e.g., a prism sheet between the light absorption film 274 and the color conversion film 273, the light absorption efficiency by the light absorption film 274 may be maximized.

Further, as a reflective film is disposed inside the color conversion sheet 270, absorption of light of the absorption wavelength band may be increased through an increase in light recycling.

The reflective film may be, e.g., a film in which two types of refractive index materials are stacked in multiple layers, such as a dichroic film, but is not limited thereto. The reflective film may be a film having a characteristic of reflecting light of a specific wavelength band.

As an example, referring to <EX 2> of FIG. 3, the color conversion sheet 270 may include an inter-layer reflective film 275 disposed between the color conversion film 273 and the light absorption film 274.

The inter-layer reflection film 275 may reflect at least a portion of light of the absorption wavelength band. The inter-layer reflection film 275 may have a high reflectance for light of the absorption wavelength band. The inter-layer reflective film 275 may have a high transmittance for light of a wavelength band other than the absorption wavelength band. The inter-layer reflective film 275 may transmit the light of the wavelength band other than the absorption wavelength band, as it is.

Since the recycling of the light of the absorption wavelength band is increased by the inter-layer reflective film 275, the light of the absorption wavelength band absorbed by the light absorption film 274 may increase. The effect of enhancing the color gamut by the light absorption film 274 may increase.

Alternatively, in some cases, a reflective film that reflects the light of the absorption wavelength band may be disposed between the light absorption film 274 and the upper film 272. A reflective film that reflects the light of the absorption wavelength band may be disposed under or above the light absorption film 274, so that light absorption performance by the light absorption film 274 may be enhanced.

Alternatively, the light absorption performance of the light absorption film 274 may be enhanced using a reflective film reflecting light of a wavelength band including the absorption wavelength band.

As an example, referring to <EX 3> of FIG. 3, the color conversion sheet 270 may include a lower reflective film 276 disposed between the lower film 271 and the color conversion film 273.

The lower reflection film 276 may reflect at least a portion of light of a wavelength band other than the first wavelength band.

The lower reflective film 276 may reflect the light of the wavelength band converted into by the color conversion film 273. The lower reflection film 276 may transmit light of a first wavelength band and reflect light of a second wavelength band and light of a third wavelength band.

The wavelength band of the light reflected by the lower reflection film 276 may include the absorption wavelength band. Light converted into by the color conversion film 273 may be reflected by the lower reflective film 276. Further, like the portion indicated by 301, the light of the absorption wavelength band may be reflected by the lower reflective film 276.

Since the recycling of the light of the second wavelength band and the light of the third wavelength band is increased by the lower reflection film 276, the conversion efficiency of the color conversion film 273 may be enhanced. Since the recycling of the light of the absorption wavelength band is increased by the lower reflective film 276, the light absorption of the light absorption film 274 may increase.

The light supply efficiency by the color conversion sheet 270 may be enhanced. A backlight unit having enhanced color gamut by the color conversion sheet 270 may be provided.

Further, according to embodiments of the disclosure, there may be provided a backlight unit having color conversion efficiency and light absorption efficiency enhanced by a structure in which color conversion and light absorption may occur in an area closer to the light source 220.

FIGS. 4, 5, 6, 7, 8, 9, and 10 are cross-sectional views illustrating another example structure of a backlight unit according to embodiments of the disclosure.

Figure 4:
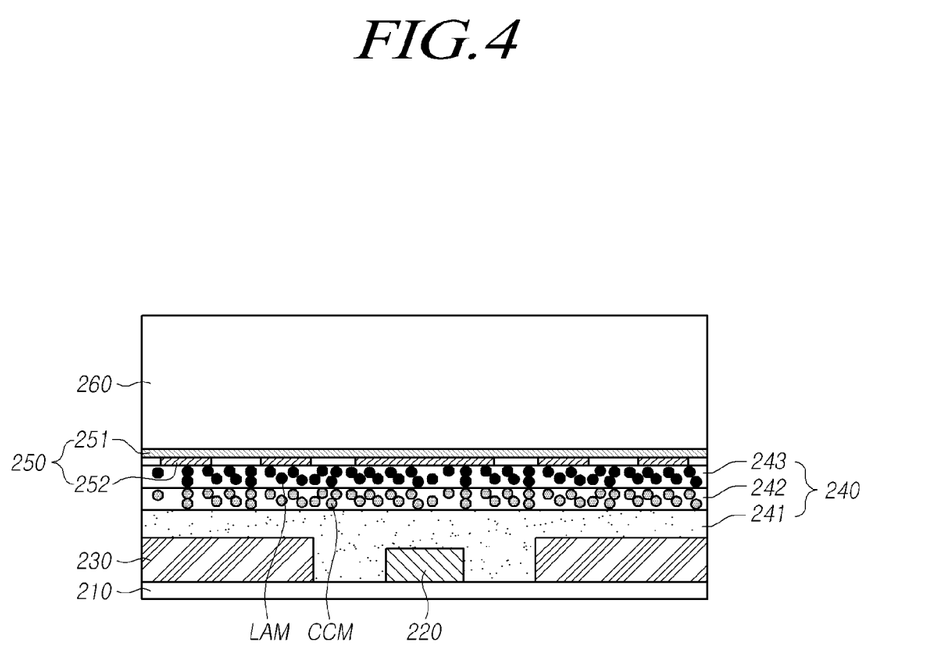
FIGS. 4, 5, 6, 7, 8, 9, and 10 are cross-sectional views illustrating another example structure of a backlight unit according to embodiments of the disclosure.

Referring to FIG. 4, a backlight unit may include a plurality of light sources 220 disposed on a circuit board 210. A reflector 230 may be disposed in at least a partial area of an area other than the area where the light source 220 is disposed on the circuit board 210.

A light source protection portion 240 may be disposed on the light source 220 and the reflector 230.

The light source protection portion 240 may include a light guide layer 241, a color conversion layer 242, and a light absorption layer 243.

The light guide layer 241 may be disposed on the light source 220 and the reflector 230. The light guide layer 241 may be disposed to surround the light source 220.

The light guide layer 241 may be a transparent layer. The light guide layer 241 may protect the light source 220 and guide the light emitted from the light source 220. The light guide layer 241 may be disposed by, e.g., molding a resin, but is not limited thereto.

The color conversion layer 242 may be disposed on the light guide layer 241.

The color conversion layer 242 may include a color conversion material CCM. The color conversion layer 242 may be, e.g., a layer in which a resin constituting the light guide layer 241 and the color conversion material CCM are mixed.

The color conversion layer 242 may convert at least a portion of the light of the first wavelength band emitted by the light source 220 into light of a wavelength band other than the first wavelength band. Light of a second wavelength band and light of a third wavelength band may be emitted by the color conversion layer 242.

The light absorption layer 243 may be disposed on the color conversion layer 242.

The light absorption layer 243 may include a light absorption material LAM. The light absorption layer 243 may be, e.g., a layer in which a resin constituting the light guide layer 241 and the light absorption material LAM are mixed.

The light absorption layer 243 may absorb the light of the absorption wavelength band that is a portion of the white wavelength band.

Since the light of a specific absorption wavelength band is absorbed by the light absorption layer 243, the color gamut may be enhanced while the light emitted by the light source 220 and the light emitted by the color conversion layer 242 are supplied to the display panel 110.

A light path control film 250 and a diffusion plate 260 may be disposed on the light absorption layer 243.

Since the color conversion layer 242 and the light absorption layer 243 are positioned in an area closer to the light source 220, the color conversion efficiency by the color conversion layer 242 and the light absorption by the light absorption layer 243 may be enhanced.

Since light is dispersed under the light path control film 250 by the light path control film 250 positioned on the light source protection portion 240, the color conversion material CCM and the light absorption material LAM may more frequently contact the light, so that the color conversion efficiency and light absorption may be enhanced.

Further, since the color conversion layer 242 and the light absorption layer 243 are disposed using a portion of the light source protection portion 240, the color conversion function and the light absorption function may be implemented without the color conversion sheet 270.

In the structure in which the color conversion layer 242 and the light absorption layer 243 are disposed using a portion of the light source protection portion 240, a structure for increasing the recycling of light using the reflection layer may be implemented.

Figure 5:
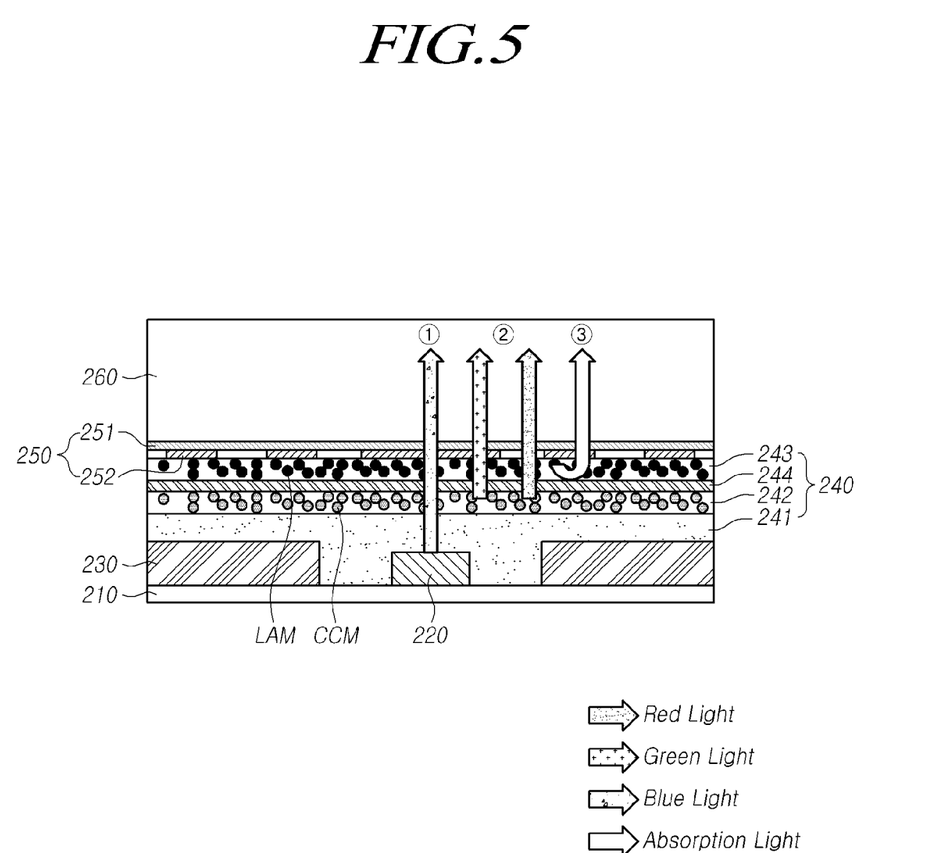

Referring to FIG. 5, the light source protection portion 240 may include a light guide layer 241, a color conversion layer 242, a light absorption layer 243, and an inter-layer reflection layer 244.

The color conversion layer 242 and the light absorption layer 243 may be sequentially disposed on the light guide layer 241. The inter-layer reflection layer 244 may be disposed between the color conversion layer 242 and the light absorption layer 243.

The inter-layer reflection layer 244 may reflect the light of the absorption wavelength band absorbed by light absorption layer 243. The inter-layer reflection layer 244 may transmit light of a wavelength band other than the absorption wavelength band.

Accordingly, as shown in ①, the light of the first wavelength band emitted by the light source 220 may be emitted above the light source protection portion 240. As shown in ②, the light of the second wavelength band and the light of the third wavelength band converted into by the color conversion layer 242 may be emitted above the light source protection portion 240.

The light of the absorption wavelength band may be reflected by the inter-layer reflection layer 244, as shown in ③. The frequency at which the light of the absorption wavelength band among the light emitted by the light source 220 or the color conversion layer 242 contacts the light absorption material LAM included in the light absorption layer 243 may increase.

As such, the inter-layer reflection layer 244 may increase the recycling of the light of the absorption wavelength band without affecting the light emitted by the light source 220 and the color conversion layer 242 to thereby increase the light absorption of the light absorption layer 243.

Figure 6:
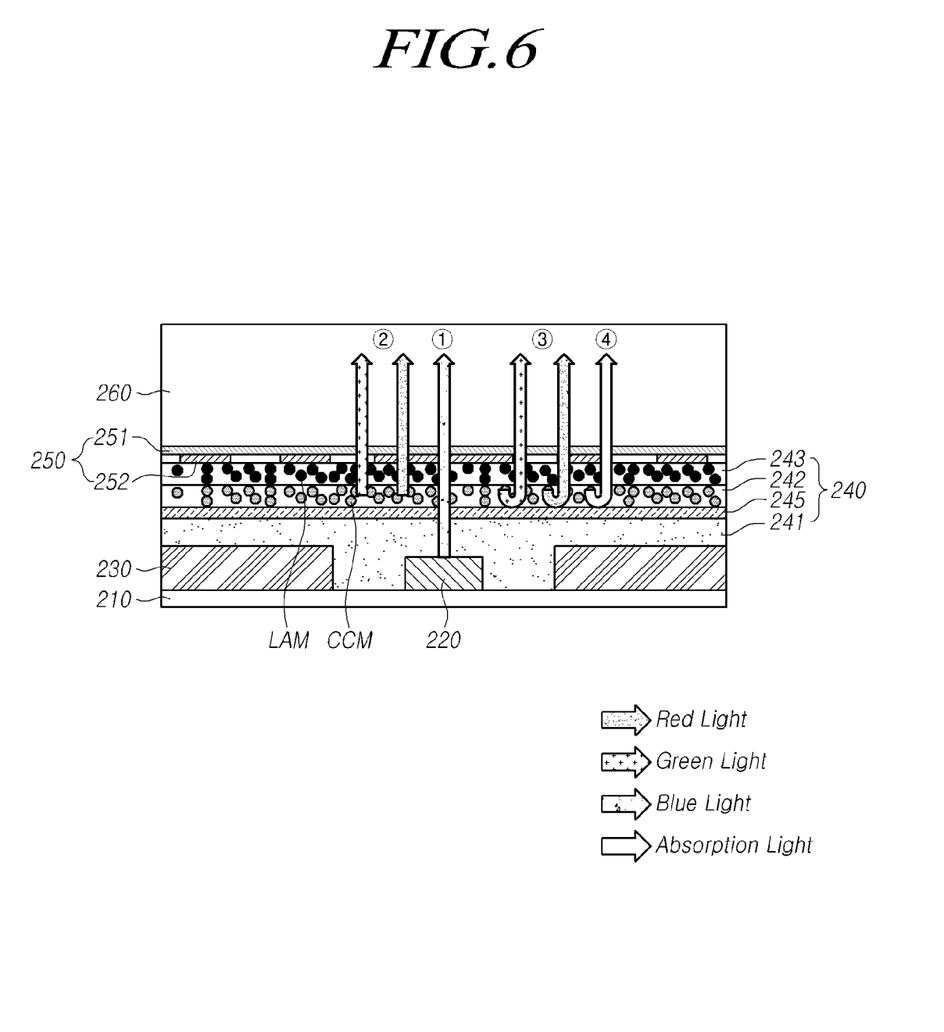

Further, a reflection layer that reflects light of a specific wavelength band may be positioned under the color conversion layer 242.

Referring to FIG. 6, the light source protection portion 240 may include a light guide layer 241, a color conversion layer 242, a light absorption layer 243, and a lower reflection layer 245.

The color conversion layer 242 and the light absorption layer 243 may be sequentially disposed on the light guide layer 241. The lower reflection layer 245 may be disposed between the light guide layer 241 and the color conversion layer 242.

The lower reflection layer 245 may reflect at least a portion of light of a wavelength band other than the first wavelength band.

The lower reflection layer 245 may reflect light of a wavelength band including the absorption wavelength band.

The lower reflection layer 245 may reflect light of the second wavelength band, light of the third wavelength band, and light of the absorption wavelength band.

Since the lower reflection layer 245 transmits the light of the first wavelength band, the light of the first wavelength band emitted from the light source 220 may be emitted above the light source protection portion 240 as shown in ①.

As shown in ②, the light of the second wavelength band and the light of the third wavelength band converted into by the color conversion layer 242 may be emitted above the light source protection portion 240.

A portion of the light converted into by the color conversion layer 242 may be reflected by the lower reflection layer 245. For example, as shown in ③, the light of the second wavelength band and the light of the third wavelength band may be reflected by the lower reflection layer 245 and emitted above the light source protection portion 240.

Since the wavelength band of the light reflected by the lower reflection layer 245 includes the absorption wavelength band, light of the absorption wavelength band may be reflected by the lower reflection layer 245 as shown in ④. The light absorption may increase due to an increase in light regeneration in the light absorption layer 243 disposed on the lower reflection layer 245.

As described above, light recycling in the light source protection portion 240 is increased due to the disposition of the reflection layer that reflects light of the specific wavelength band, so that light supply efficiency and color gamut of the backlight unit may be enhanced.

Figure 7:
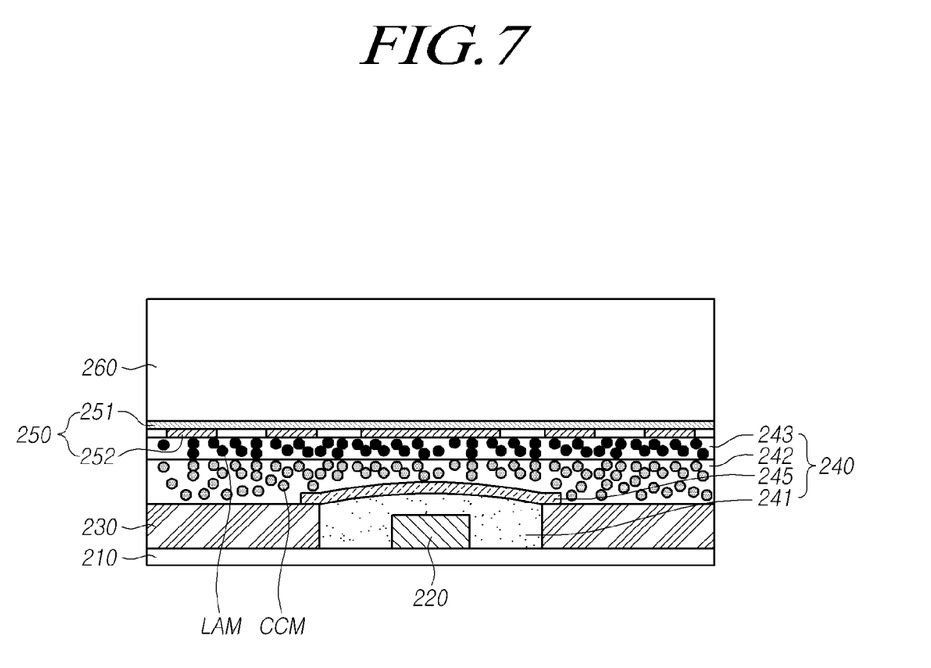

Further, since the reflector 230 is positioned under the light source protection portion 240, the reflection layer included in the light source protection portion 240 may be disposed only in a partial area in some cases.

Referring to FIG. 7, the light source 220 and the reflector 230 may be disposed on the circuit board 210. A light source protection portion 240 may be disposed on the light source 220 and the reflector 230.

The light source protection portion 240 may include a light guide layer 241, a color conversion layer 242, a light absorption layer 243, and a lower reflection layer 245.

The light guide layer 241 may be disposed in an area where the reflector 230 is not disposed. The light guide layer 241 may be disposed inside the hole of the reflector 230 in which the light source 220 is disposed. The light guide layer 241 may be disposed to be surrounded by the reflector 230.

The lower reflection layer 245 may be positioned on the light guide layer 241. The lower reflection layer 245 may be disposed not to overlap the reflector 230. The lower reflection layer 245 may be disposed in at least a partial area of the area where the reflector 230 is not disposed.

Alternatively, a portion of the lower reflection layer 245 may overlap the reflector 230. As shown in FIG. 7, an edge portion of the lower reflection layer 245 may be positioned on the reflector 230.

The color conversion layer 242 and the light absorption layer 243 may be sequentially disposed on the reflector 230 and the lower reflection layer 245.

The light of the second wavelength band and the light of the third wavelength band converted into by the color conversion layer 242 may be reflected by the reflector 230 and the lower reflection layer 245. The light of the absorption wavelength band absorbed by light absorption layer 243 may also be reflected by reflector 230 and lower reflection layer 245.

A structure in which light recycling is increased may be implemented by a structure in which the reflector 230 and the lower reflection layer 245 do not overlap or partially overlap.

When the light guide layer 241 is disposed in the hole of the reflector 230, the upper surface of the light guide layer 241 may have a convex shape. In the process of disposing a resin inside the hole of the reflector 230 and performing molding, the upper surface of the light guide layer 241 may be implemented in various shapes, such as a convex shape or a concave shape.

As the upper surface of the light guide layer 241 disposed to surround the light source 220 in the hole of the reflector 230 is rendered to have a convex shape, diffusion of light emitted from the light source 220 may be enhanced.

Since the color conversion layer 242 and the light absorption layer 243, respectively, are a layer of a mixture of a color conversion material CCM and the same material as the light guide layer 241 and a layer of a mixture of a light absorption material LAM and the same material as the light guide layer 241, they may also have a light guide function.

Even if the light guide layer 241 is positioned only in an area where the reflector 230 is not disposed, a structure in which light recycling is increased without deteriorating the light guiding function may be provided.

Figure 8:
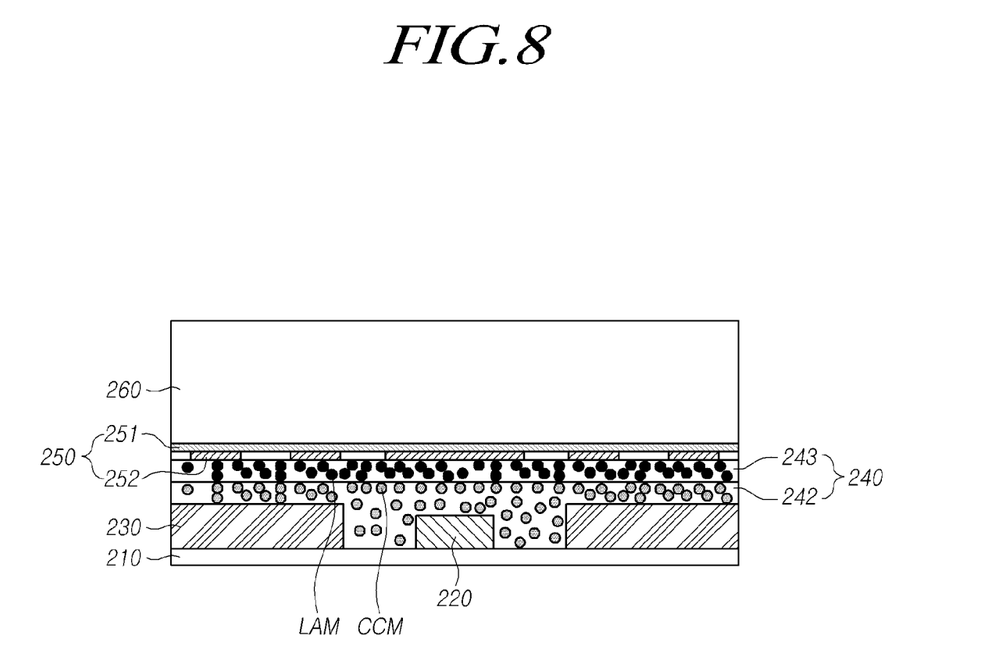

Further, as a light guiding function may be provided by the color conversion layer 242 and the light absorption layer 243, a structure in which the color conversion layer 242 and the light absorption layer 243 are disposed without the light guide layer 241 may be implemented.

With this structure, a backlight unit capable of reducing the thickness of the light source protection portion 240 or reducing the process steps of the light source protection portion 240 may be provided.

Referring to FIG. 8, the light source protection portion 240 may include a color conversion layer 242 and a light absorption layer 243.

The color conversion layer 242 may be disposed on the light source 220 and the reflector 230. The color conversion layer 242 may be disposed in contact with the upper surface of the light source 220. The color conversion layer 242 may be a layer in which a color conversion material CCM is mixed with a resin.

The light absorption layer 243 may be disposed on the color conversion layer 242. The light absorption layer 243 may be disposed in contact with the color conversion layer 242. The light absorption layer 243 may be a layer in which a light absorption material LAM is mixed with a resin.

In this case, a first process of molding a resin mixed with a color conversion material CCM on the light source 220 and the reflector 230 may be performed. A second process of molding a resin mixed with a light absorption material LAM on the color conversion layer 242 may be performed.

A light source protection portion 240 that reduces process steps or an overall thickness of the light source protection portion 240 and provides color conversion and light absorption functions may be disposed on the light source 220 and the reflector 230.

Since color conversion and absorption of light of the absorption wavelength band are performed in an area adjacent to the light source 220, color conversion efficiency and color gamut may be enhanced.

Figure 9:
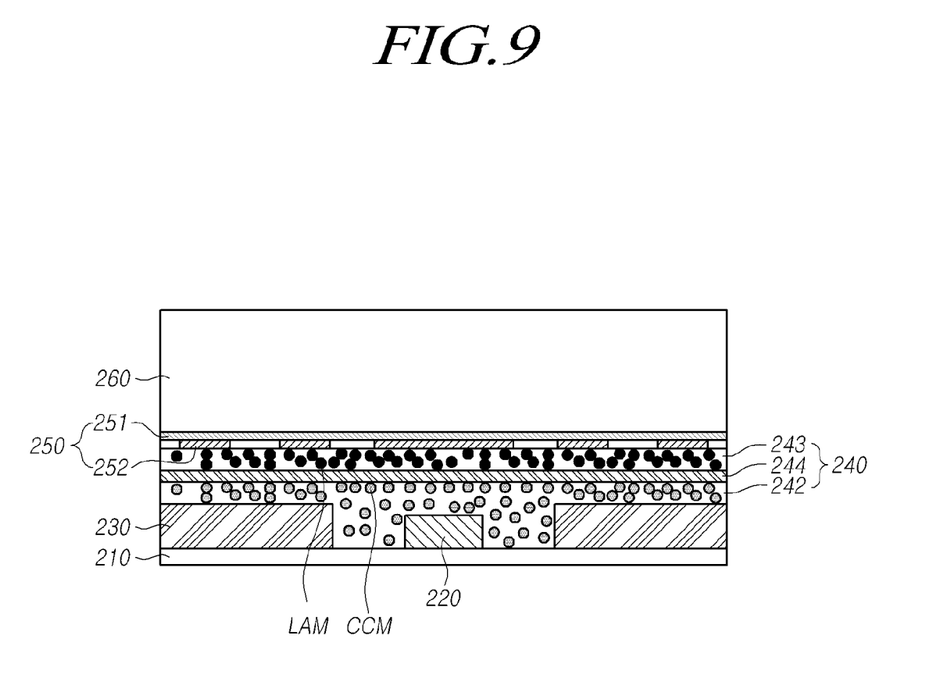

Further, even in a structure in which the color conversion layer 242 is disposed directly on the light source 220, a structure in which the reflection layer is positioned and the light recycling may be increased may be provided.

As an example, referring to FIG. 9, the light source protection portion 240 may include a color conversion layer 242, a light absorption layer 243, and an inter-layer reflection layer 244.

The color conversion layer 242 may be disposed in contact with the light source 220. The light absorption layer 243 may be positioned on the color conversion layer 242. The inter-layer reflection layer 244 may be disposed between the color conversion layer 242 and the light absorption layer 243. The inter-layer reflection layer 244 may reflect light of the absorption wavelength band.

The recycling of the light of the absorption wavelength band may be increased by the inter-layer reflection layer 244. The frequency at which light of the absorption wavelength band contacts the light absorption material included in the light absorption layer 243 may be increased.

The process steps or overall thickness of the light source protection portion 240 may be reduced, and light recycling efficiency and color gamut may be enhanced.

Figure 10:
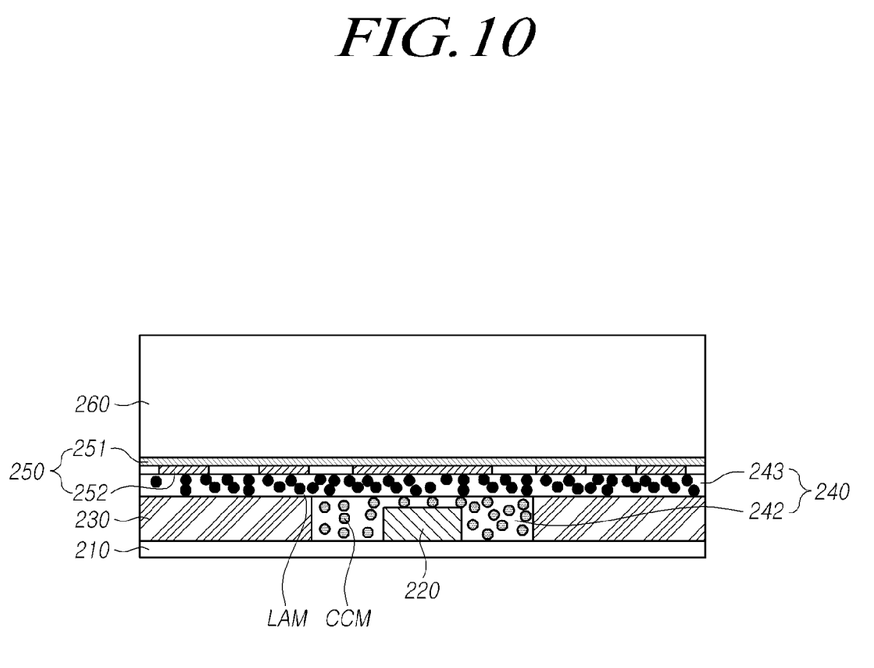

In some cases, the color conversion layer 242 may be disposed only inside the hole of the reflector 230.

Referring to FIG. 10, the light source protection portion 240 may include a color conversion layer 242 and a light absorption layer 243.

The color conversion layer 242 may be disposed inside the hole of the reflector 230. The color conversion layer 242 may be disposed to surround the light source 220.

Since the color conversion layer 242 is disposed to surround the light source 220, the light of the first wavelength band emitted by the light source 220 may be converted into light of the second wavelength band and the third wavelength band by the color conversion layer 242, which are then emitted.

The light of the absorption wavelength band may be absorbed by the light absorption layer 243 positioned on the color conversion layer 242.

As the light absorption layer 243 is disposed in contact with the reflector 230, the frequency at which the light of the absorption wavelength band reflected by the reflector 230 contacts the light absorption material LAM included in the light absorption layer 243 may increase. A structure in which light recycling is increased by the reflector 230 may be provided.

When the color conversion layer 242 is disposed inside the hole of the reflector 230, the upper surface of the color conversion layer 242 may have a convex shape. A reflection layer that reflects light of a wavelength band other than the first wavelength band may be disposed on the color conversion layer 242. The reflection layer may be disposed not to overlap, or to overlap only at an edge portion, the reflector 230.

With the structure in which the color conversion layer 242 is disposed in the hole of the reflector 230, there may be provided a backlight unit having a simplified structure of the light source protection portion 240 and enhanced color gamut and light recycling efficiency.

The foregoing embodiments are briefly described below.

A display device 100 according to embodiments of the disclosure may include a display panel 110 and a backlight unit supplying light to the display panel 110.

The backlight unit may include a plurality of light sources 220 emitting light of a first wavelength band and a light source protection portion 240 disposed to surround the plurality of light sources 220 and including a color conversion layer 242 converting at least a portion of the light of the first wavelength band into light of a wavelength band other than the first wavelength band and a light absorption layer 243 disposed on the color conversion layer 242 and absorbing light of an absorption wavelength band which is a portion of a white wavelength band.

The light source protection portion 240 may further include a lower reflection layer 245 disposed between the plurality of light sources 220 and the color conversion layer 242 and reflecting the light of the wavelength band other than the first wavelength band.

The lower reflection layer 245 may reflect the light of the absorption wavelength band.

The light source protection portion 240 may further include a transparent light guide layer 241 disposed between the plurality of light sources 220 and the lower reflection layer 245 and contacting the plurality of light sources 220.

The backlight unit may further comprise a reflector 230 disposed in at least a partial area of an area other than an area the plurality of light sources 220 are disposed.

The lower reflection layer 245 may be spaced apart from the plurality of light sources 220 and be disposed in at least a partial area of an area other than the area where the reflector 230 is disposed. At least a portion of the color conversion layer 242 may be disposed in contact with an upper surface of the reflector 230. In this case, the light guide layer 241 may be positioned between the plurality of light sources 220 and the lower reflection layer 245, be disposed in an area surrounded by the reflector 230, and have a convex upper surface.

Alternatively, the light source protection portion 240 may not include the lower reflection layer 245 but may include a transparent light guide layer 241 disposed between the plurality of light sources 220 and the color conversion layer 242 and contacting the plurality of light sources 220.

The color conversion layer 242 may be a layer of a mixture of a color conversion material CCM and a same material as the light guide layer 241. The light absorption layer 243 may be a layer of a mixture of a light absorption material LAM and the same material as the light guide layer 241.

The color conversion layer 242 may be disposed in contact with the plurality of light sources 220.

The light source protection portion 240 may further include an inter-layer reflection layer 244 disposed between the color conversion layer 242 and the light absorption layer 243 and reflecting the light of the absorption wavelength band.

An upper surface of the color conversion layer 242 may directly contact a lower surface of the light absorption layer 243.

The backlight unit may further comprise a light path control film 250 including a plurality of light path control patterns 252 disposed on the light source protection portion 240, positioned in respective corresponding areas of the plurality of light sources 220, and controlling a path of light emitted from the plurality of light sources 220.

A display device 100 according to embodiments of the disclosure may comprise a display panel 110 and a backlight unit supplying light to the display panel 110. The backlight unit may include a plurality of light sources 220 emitting light of a first wavelength band and a color conversion sheet 270 positioned between the plurality of light sources 220 and the display panel 110 and including a color conversion film 273 converting at least a portion of the light of the first wavelength band into light of a wavelength band other than the first wavelength band and a light absorption film 274 disposed on the color conversion film 273 and absorbing light of an absorption wavelength band which is a portion of a white wavelength band.

The color conversion sheet 270 may further include a lower reflective film 276 disposed between the plurality of light sources 220 and the color conversion film 273 and reflecting the light of the wavelength band other than the first wavelength band.

The lower reflective film 276 may reflect the light of the absorption wavelength band.

The color conversion sheet 270 may further include an inter-layer reflective film 275 disposed between the color conversion film 273 and the light absorption film 274 and reflecting the light of the absorption wavelength band.

A backlight unit according to embodiments of the disclosure may comprise a plurality of light sources 220 disposed on a circuit board 210 and emitting light of a first wavelength band, a color conversion layer 242 disposed on the plurality of light sources 220 and in contact with the plurality of light sources 220 and converting at least a portion of the light of the first wavelength band into light of a wavelength band other than the first wavelength band, a light absorption layer 243 disposed on the color conversion layer 242 and absorbing light of an absorption wavelength band which is a portion of a white wavelength band, and a light path control film 250 including a plurality of light path control patterns 252 disposed on the light absorption layer 243, positioned in respective corresponding areas of the plurality of light sources 220, and blocking at least a portion of light emitted from the plurality of light sources 220.

The backlight unit further may comprise a reflector 230 disposed under the color conversion layer 242 and in at least a partial area of an area other than an area where the plurality of light sources 220 are disposed and an inter-layer reflection layer 244 disposed between the color conversion layer 242 and the light absorption layer 243 and reflecting the light of the absorption wavelength band.

The light absorption layer 243 may absorb a portion of light converted into by the color conversion layer 242.

The above description has been presented to enable any person skilled in the art to make and use the technical idea of the disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the disclosure. The above description and the accompanying drawings provide an example of the technical idea of the disclosure for illustrative purposes only. That is, the disclosed embodiments are intended to illustrate the scope of the technical idea of the disclosure. Thus, the scope of the disclosure is not limited to the embodiments shown, but is to be accorded the widest scope consistent with the claims. The scope of protection of the disclosure should be construed based on the following claims, and all technical ideas within the scope of equivalents thereof should be construed as being included within the scope of the disclosure.

What is claimed is:

1. A display device, comprising:
   a display panel; and
   a backlight unit configured to supply light to the display panel,
   wherein the backlight unit includes:
      a plurality of light sources configured to emit light of a first wavelength band; and
      a light source protection portion that surrounds the plurality of light sources, the light source protection portion including a color conversion layer that converts at least a portion of the light of the first wavelength band into light of a wavelength band other than the first wavelength band, and a light absorption layer on the color conversion layer and absorbs light of an absorption wavelength band which is a portion of a white wavelength band,
   wherein the light source protection portion further includes a lower reflection layer between the plurality of light sources and the color conversion layer, the lower reflection layer reflecting the light of the wavelength band other than the first wavelength band.

2. The display device of claim 1, further comprising:
   a reflector in at least a partial area of an area other than an area that includes the plurality of light sources,
   wherein the lower reflection layer is spaced apart from the plurality of light sources and disposed in at least a partial area of an area other than the area where the reflector is disposed.

3. The display device of claim 2, wherein at least a portion of the color conversion layer is in contact with an upper surface of the reflector.

4. The display device of claim 3, further comprising:
a light guide layer between the plurality of light sources and the lower reflection layer, the light guide layer in an area surrounded by the reflector, and the light guide layer having a convex upper surface.

5. The display device of claim 1, wherein the light source protection portion further includes a transparent light guide layer between the plurality of light sources and the color conversion layer, the transparent light guide layer in contact with the plurality of light sources.

6. The display device of claim 5, wherein the color conversion layer is a layer of a mixture of a color conversion material and a same material as the light guide layer, and the light absorption layer is a layer of a mixture of a light absorption material and the same material as the light guide layer.

7. The display device of claim 1, wherein the lower reflection layer reflects the light of the absorption wavelength band.

8. The display device of claim 1, wherein the light source protection portion further includes a transparent light guide layer between the plurality of light sources and the lower reflection layer, the transparent light guide layer in contact with the plurality of light sources.

9. The display device of claim 1, wherein the color conversion layer is in contact with the plurality of light sources.

10. The display device of claim 1, wherein the light source protection portion further includes an inter-layer reflection layer between the color conversion layer and the light absorption layer, the inter-layer reflection layer reflecting the light of the absorption wavelength band.

11. The display device of claim 1, wherein an upper surface of the color conversion layer directly contacts a lower surface of the light absorption layer.

12. The display device of claim 1, further comprising:
a light path control film including a plurality of light path control patterns on the light source protection portion and positioned in respective corresponding areas of the plurality of light sources, the plurality of light path control patterns controlling a path of light emitted from the plurality of light sources.

13. A display device, comprising:
a display panel; and
a backlight unit configured to supply light to the display panel,
wherein the backlight unit includes:
a plurality of light sources configured to emit light of a first wavelength band; and
a color conversion sheet between the plurality of light sources and the display panel, the color conversion sheet including a color conversion film that converts at least a portion of the light of the first wavelength band into light of a wavelength band other than the first wavelength band, and a light absorption film on the color conversion film and absorbs light of an absorption wavelength band which is a portion of a white wavelength band,
wherein the color conversion sheet further includes a lower reflective film between the plurality of light sources and the color conversion film, the lower reflective film reflecting the light of the wavelength band other than the first wavelength band.

14. The display device of claim 13, wherein the lower reflective film reflects the light of the absorption wavelength band.

15. The display device of claim 13, wherein the color conversion sheet further includes an inter-layer reflective film between the color conversion film and the light absorption film, the inter-layer reflective film reflecting the light of the absorption wavelength band.

16. A backlight unit, comprising:
a plurality of light sources disposed on a circuit board, the plurality of light sources configured to emit light of a first wavelength band;
a color conversion layer on the plurality of light sources and in contact with the plurality of light sources, the color conversion layer converting at least a portion of the light of the first wavelength band into light of a wavelength band other than the first wavelength band;
a light absorption layer on the color conversion layer, the light absorption layer absorbing light of an absorption wavelength band which is a portion of a white wavelength band; and
a light path control film including a plurality of light path control patterns on the light absorption layer, the plurality of light path control patterns positioned in respective corresponding areas of the plurality of light sources and blocking at least a portion of light emitted from the plurality of light sources.

17. The backlight unit of claim 16, further comprising:
a reflector under the color conversion layer and in at least a partial area of an area other than an area that includes the plurality of light sources; and
an inter-layer reflection layer between the color conversion layer and the light absorption layer, the inter-layer reflection layer reflecting the light of the absorption wavelength band.

18. The backlight unit of claim 16, wherein the light absorption layer absorbs a portion of light converted by the color conversion layer.

\* \* \* \* \*